3,114,690
FUEL ELEMENTS FOR NUCLEAR REACTORS
Frank Butler, Knutsford, England, assignor to United Kingdom Atomic Energy Authority, London, England
Filed July 19, 1960, Ser. No. 43,763
Claims priority, application Great Britain July 24, 1959
2 Claims. (Cl. 204—154.2)

This invention relates to processes for the manufacture of fuel elements for nuclear reactors and it is concerned with fuel elements of the kind comprising a nuclear fuel member enclosed in a protective sheath.

It has long been the custom to include helium in fuel elements of the kind described above. At one time the helium served a double function, namely, for heat transfer between fuel member and sheath and for detection of leaks in the sheath by mass-spectrometer detection of helium. With the present day magnesium alloy sheathed uranium rods the helium is only included for its leak detection function and hence is only included in small quantities. The helium is introduced by first evacuating the fuel element through an open end of the sheath, then allowing helium to enter up to 250 mm. pressure, and then placing a temporary seal over the open end and then finally sealing the open end with an end cap making an edge sealing weld with the sheath.

It is found that the temporary seal tends to leak so that air enters the sheath with the result that, on heating, pressures can arise in the sheath which separates the sheath from the fuel member. These pressures can result in hot spots and partial release of the sheath from locking grooves in the fuel member into which the sheath has been forced by external pressurisation.

According to the present invention, steps in a process for the manufacture of a fuel element of the kind described are, first, the evacuation of the fuel element followed by filling with a mixture of helium and oxygen, oxygen predominating, up to at least atmospheric pressure, and second, completely sealing the sheath, and third, heating the fuel element so that the oxygen is taken up by the fuel member.

Figure 1:
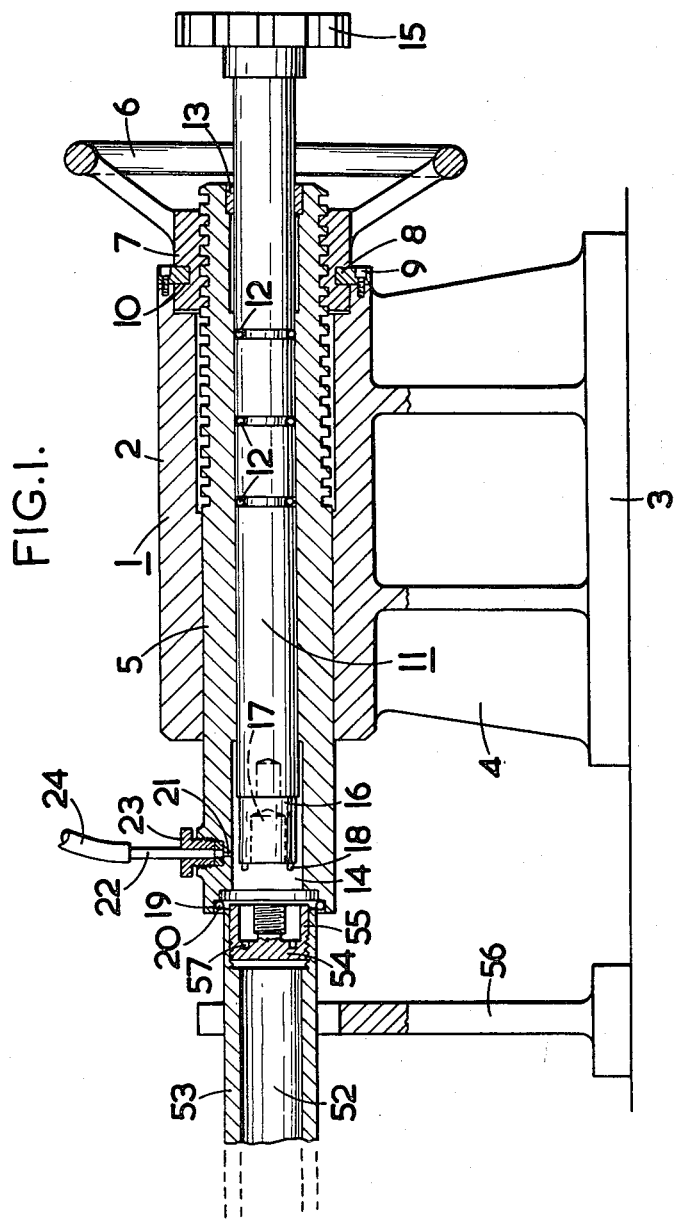
Figure 2:
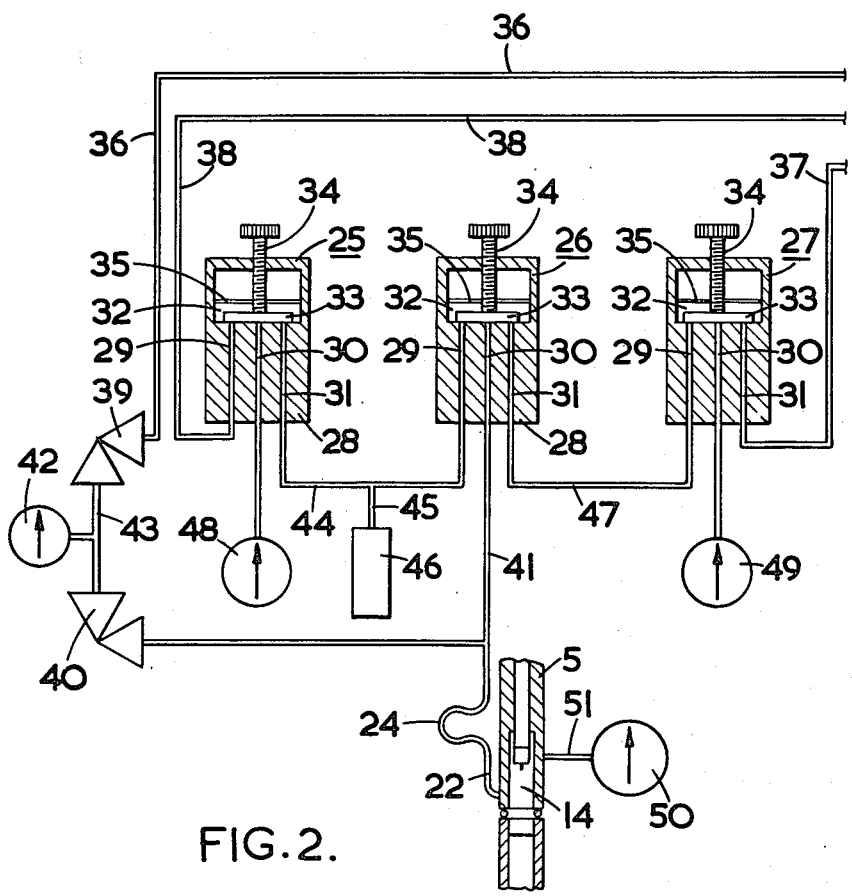

A process in accordance with the invention will now be described by way of example with reference to the accompanying drawings in which:

FIG. 1 is a longitudinal sectional elevation.
FIG. 2 is a gas circuit diagram.

In FIG. 1 there is shown the head of a machine for filling nuclear reactor fuel elements with a mixture of oxygen and helium. The machine head comprises a head stock 1 having a tubular body 2 cast integrally with a base plate 3 and support webs 4. A tubular sleeve 5 slidable in the body 2 is threaded part way along its length from one end. A handwheel 6 has a central boss 7 which is internally threaded to fit the threaded part of the sleeve 5. The handwheel 6 is located by a split ring 8 which is fixed to the body 1 by screws 9 and engages with an external circumferential groove 10 in the boss 7 of the handwheel 6. A rotatable shaft 11 slidably sealed in the sleeve 5 by three O ring seals 12 bears in an oil impregnated bearing bush 13 fitted in the threaded end of the sleeve 5. The sleeve 5 is counterbored at its plain end to form a chamber 14 of larger diameter than the main bore of the sleeve 5. A handwheel 15 is fitted to the shaft 11 at the end external to the sleeve 5 and a fuel element end cap driving tool 16 is screw fitted on the end of the shaft 11 inside the chamber 15. The end cap driving tool 16 is of cylindrical form having an axial drilling 17 and two projections 18. An internal groove 19 at the plain end of the sleeve 5 is fitted with a rubber O ring 20. A gas connection to the chamber 14 through a drilling 21 in the wall of the sleeve 5 is provided by a short length of tube 22 and a coupling nut 23. A flexible coupling line 24 connecting with the tube 22 leads to the gas circuit shown in FIG. 2. The gas circuit shown in FIG. 2 includes three identical valves 25, 26 and 27, each comprising a body 28 having three drillings 29, 30 and 31. The drillings 29, 30 and 31 terminate in a chamber 32 in the valve body 28 and flow of gas through the valve is controlled by a pad 33 carried by a threaded valve stem 34. The stem 34 is sealed in the chamber 32 by a flexible diaphragm 35 and is screwed up or down either to open up the drillings 29, 30 and 31 to the chamber 32 below the diaphragm 35 or to completely close off the drillings 29, 30 and 31. Three lines are provided in the circuit, a vacuum line 36, a helium line 37 and an oxygen line 38. The helium line 37 is connected to the drilling 31 of the valve 27 and the oxygen line 38 is connected to the drilling 29 of the valve 25. The vacuum line 36 leads through two valves 39 and 40 to a connection 41 from the central drilling 30 of the valve 26. A pressure gauge 42 is connected with the connection 43 between the two valves 39 and 40. The connection 41 from the central drilling 30 of the valve 26 leads to the chamber 15 in the sleeve 5 of the machine head (see FIG. 1) through the flexible coupling line 24 and the tube 22. The drilling 31 in the valve 25 is connected with the drilling 29 in the valve 26 by a connection 44 having a branch pipe 45 leading to a reservoir chamber 46. The drilling 31 in the valve 26 is connected with the drilling 29 in the valve 27 by a connection 47. A pressure gauge 48 is connected with the central drilling 30 in the valve 25 and a pressure gauge 49 is connected with the central drilling 30 in the valve 27.

A pressure gauge 50 is connected with the chamber 14 in the sleeve 5 of the machine head by a connection 51.

The process of the invention is applicable to the type of fuel element comprising a rod of fissile material 52 (see FIG. 1) enclosed in a tubular protective sheath 53 of material having a low neutron capture cross section. Each end of the sheath 53 is closed by a screwed end cap 54 having a plain skirt 55 which is a close fit in the end of the sheath 53. After screwing the end caps 54 home sealing welds are made between their skirts 55 and the ends of the sheath 53. After insertion of the rod of fissile material 52 in the sheath 53 one end cap 54 is screwed home into one end of the sheath 53 and the sealing weld made. The second end cap 54 is partially screwed into the other end of the sheath 53 and the fuel element is located horizontally on V blocks 56 axially in line with the sleeve 5 of the machine head. The sleeve 5 is now advanced by rotating the handwheel 6 so that the O ring 20 in the end of the sleeve 5 seals about the end of the fuel element sheath 5 enclosing the partially inserted end cap 54. The valves 26, 39 and 40 are now opened so that the interior of the sleeve 5 is connected to the vacuum line 36 and the pressure in the sheath 53 of the fuel element is reduced to about 1 millimetre of mercury. The valve 39 is now closed to isolate the sheath 53 from the vacuum line 36 and the pressure rise on the gauge 42 is noted to ensure that there is no excessive inleakage of air into the system. Valves 26 and 40 are now closed and valves 25 and 27 are opened allowing oxygen under pressure into the connection 44 and reservoir 46 and helium into the connection 47. The pressure readings of the gauges 48 and 49 are noted and then valves 25 and 27 are closed and valve 26 is opened allowing the mixture of helium and oxygen to pass into the fuel element sheath 53 through the connection 41, the flexible line 24 and the pipe 22. The final pressure in the sheath 53 is noted on the gauge 50. The shaft 11 is now pushed along the sleeve 5 so that the projections 18 on the end cap driving tool 16 engage with recesses 57 in the end cap 54 and the end cap 54 is screwed home by rotating the shaft 11 through the handwheel 15. The sleeve 5 is now retracted by rotation of the handwheel 6 and the fuel element is removed from the V blocks 56. A sealing weld is now made between the end of the fuel element sheath 53 and the skirt 55 of the end cap 54. The fuel element is now heated at 390° C. for half an hour (after heating for one hour to bring to temperature) so that the oxygen in the sheath 53 is taken up by slight oxidation of the fissile fuel member 52. The heating may be a separate step in the process or may be carried out when subjecting the fuel element to hydraulic pressurisation at an elevated temperature in order to bring the sheath 53 into intimate contact with the fissile fuel member 52.

By choosing suitable inlet pressures for the oxygen and helium it is arranged that the final equilibrium pressure of the oxygen/helium mixture in the fuel element sheath 53 is atmospheric.

By arranging a filling to atmospheric pressure a less reliable temporary seal can be used before final sealing as there is no pressure difference across the temporary seal and hence no risk of inleakage of air and no risk of inert gas inleakage when the sealing weld is made by arc welding under a blanket of inert gas such as argon.

By heating, and thereby removing the oxygen, only a minor quantity of leak testing gas (namely helium) is left inside the sheath and thus, on further re-heating, excess pressures are not generated in the sheath. With the system of the prior art described above, leakage at the temporary seal allowed the ingress of nitrogen from the air. Nitrogen is not readily taken up by the fuel member and hence remains to cause excessive pressures on heating.

A suitable helium/oxygen mixture is 5% helium and 95% oxygen by volume. The oxygen causes very slight oxidation of the surface of the fuel member but this is only of the order of a few angstroms in thickness which is of minor significance when considering heat transfer between fuel member and sheath.

I claim:

1. In a process for the manufacture of a nuclear reactor fuel element of the kind comprising a metallic nuclear fuel member enclosed in a protective sheath, the steps of evacuating the protective sheath after insertion of the fuel member followed by filling with a mixture of helium and oxygen, oxygen predominating, up to at least atmospheric pressure, completely sealing the protective sheath and then heating the fuel element so that the oxygen is taken up by the fuel member.

2. The process as claimed in claim 1 wherein the mixture of helium and oxygen comprises 5% helium and 95% oxygen.

References Cited in the file of this patent

UNITED STATES PATENTS 2,915,815     Bean et al. _____ Dec. 8, 1959